(12) United States Patent
Hess et al.

(10) Patent No.: US 11,212,015 B2
(45) Date of Patent: Dec. 28, 2021

(54) INTERFERENCE SUPPRESSION USING MACHINE LEARNING

(71) Applicant: The Aerospace Corporation, El Segundo, CA (US)

(72) Inventors: Phillip B. Hess, Venice, CA (US); Andres I. Vila Casado, Culver City, CA (US); Aidan Wilson, Fullerton, CA (US)

(73) Assignee: THE AEROSPACE CORPORATION, El Segundo, CA (US)

(*) Notice: Subject to any disclaimer, the term of this patent is extended or adjusted under 35 U.S.C. 154(b) by 0 days.

(21) Appl. No.: 16/878,354

(22) Filed: May 19, 2020

(65) Prior Publication Data
US 2021/0367681 A1    Nov. 25, 2021

(51) Int. Cl.
*H04B 15/00* (2006.01)
*H04B 1/10* (2006.01)
*H04K 3/00* (2006.01)

(52) U.S. Cl.
CPC .................................. *H04B 15/00* (2013.01)

(58) Field of Classification Search
CPC .......... H04B 1/04; H04B 1/0475; H04B 1/16; H04B 1/7079; H04B 1/7097; H04B 1/7102; H04B 1/7107; H04B 1/719; H04B 7/0842; H04B 7/0848; H04B 7/0854; H04B 7/15585; H04B 15/00; H04B 17/345; H04B 2001/7154; H04W 24/06; H04W 52/243; H04K 3/22; H04K 3/224; H04K 3/228; H04K 3/28; H04K 3/43; H04K 3/90; G06F 17/14; G06F 17/142; G06F 17/148; G01S 19/21; G01S 19/23; G01S 19/35

See application file for complete search history.

(56) References Cited

U.S. PATENT DOCUMENTS 4,246,541 A    1/1981 Ishigaki
5,097,218 A    3/1992 Cooper
(Continued)

FOREIGN PATENT DOCUMENTS

CN    108390678 A  *  8/2018
EP    0393542 A2   10/1990

OTHER PUBLICATIONS

Amin, "Interference mitigation in spread spectrum communication systems using time-frequency distributions," *IEEE Trans. Signal Processing*, 45(1):90-101 (1997).
(Continued)

*Primary Examiner* — Quochien B Vuong
(74) *Attorney, Agent, or Firm* — Jones Day

(57) ABSTRACT

Methods, systems, and computer program products are described for automatically reducing interference within received signals. A first radio frequency (RF) signal having (i) a desired component and (ii) an interference component with a noise component and a jammed component is received. A trained machine learning (ML) model extracts, from the RF signal, the jammed component and a portion of the noise component. The trained ML model generates and outputs a second RF signal comprising the desired component and a reduced noise component. The reduced noise component has the portion of the noise component removed. The jammed component is removed from the second RF signal.

18 Claims, 6 Drawing Sheets

(56) References Cited

U.S. PATENT DOCUMENTS

| | | | |
|---|---|---|---|
| 5,263,048 A | 11/1993 | Wade | |
| 5,479,440 A | 12/1995 | Esfahani | |
| 5,517,531 A | 5/1996 | Bond et al. | |
| 5,533,071 A | 7/1996 | Krishnamurthy et al. | |
| 5,654,538 A | 8/1997 | Kane | |
| 5,815,529 A | 9/1998 | Wang | |
| 5,974,100 A | 10/1999 | Carsello | |
| 6,031,882 A | 2/2000 | Enge et al. | |
| 6,055,431 A | 4/2000 | Dybdal | |
| 6,097,820 A | 8/2000 | Turner | |
| 6,122,309 A * | 9/2000 | Bergstrom | H04B 1/123 375/130 |
| 6,219,334 B1 | 4/2001 | Sato et al. | |
| 6,266,633 B1 | 7/2001 | Higgins et al. | |
| 6,552,995 B1 | 4/2003 | Nakada | |
| 6,670,901 B2 | 12/2003 | Brueske et al. | |
| 6,975,673 B1 | 12/2005 | Rouquette | |
| 7,099,270 B2 | 8/2006 | Yamaguchi | |
| 7,173,990 B2 | 2/2007 | Kim et al. | |
| 7,212,569 B1 | 5/2007 | Clark | |
| 7,266,166 B2 | 9/2007 | Hentttu | |
| 7,277,475 B1 | 10/2007 | Nguyen et al. | |
| 7,646,559 B1 | 1/2010 | Cheung et al. | |
| 7,894,556 B2 | 2/2011 | Casabona et al. | |
| 8,050,336 B2 | 11/2011 | Bocquet | |
| 8,155,218 B2 | 4/2012 | Hong et al. | |
| 8,199,851 B1 | 6/2012 | Dybdal et al. | |
| 8,238,410 B2 | 8/2012 | Lennen | |
| 8,259,857 B2 | 9/2012 | Dybdal et al. | |
| 8,275,067 B2 | 9/2012 | Garg et al. | |
| 8,462,879 B2 | 6/2013 | Dybdal et al. | |
| 8,515,335 B2 | 8/2013 | Dafesh et al. | |
| 8,614,940 B1 | 12/2013 | Dybdal et al. | |
| 8,711,675 B1 | 4/2014 | Dybdal et al. | |
| 8,804,808 B1 | 8/2014 | Dybdal et al. | |
| 9,065,521 B1 | 6/2015 | Dybdal et al. | |
| 9,094,275 B1 * | 7/2015 | Papadimitriou | H04L 27/2688 |
| 9,197,360 B2 | 11/2015 | Wyckoff | |
| 9,391,654 B2 | 7/2016 | Wyckoff et al. | |
| 9,484,974 B2 * | 11/2016 | Tu | H04B 1/525 |
| 9,628,122 B1 | 4/2017 | Clark et al. | |
| 9,654,158 B2 * | 5/2017 | Dafesh | H04B 1/1036 |
| 9,923,598 B2 | 3/2018 | Dafesh et al. | |
| 10,545,245 B2 * | 1/2020 | Ying | G01S 19/21 |
| 10,775,510 B2 * | 9/2020 | Agee | G01S 19/215 |
| 2002/0094022 A1 | 7/2002 | Bially et al. | |
| 2002/0155812 A1 | 10/2002 | Takada | |
| 2003/0016079 A1 | 1/2003 | Carrozza et al. | |
| 2004/0028222 A1 | 2/2004 | Sewell et al. | |
| 2004/0235445 A1 | 11/2004 | Gomez | |
| 2005/0047487 A1 | 3/2005 | Sakaue et al. | |
| 2005/0285781 A1 * | 12/2005 | Park | G01S 19/254 342/357.48 |
| 2006/0291375 A1 | 12/2006 | Nishikawa | |
| 2007/0076783 A1 | 4/2007 | Dishman et al. | |
| 2008/0056395 A1 | 3/2008 | Brink et al. | |
| 2008/0107217 A1 | 5/2008 | Vrcelj et al. | |
| 2008/0260014 A1 | 10/2008 | Yang et al. | |
| 2009/0191827 A1 | 7/2009 | Hellberg | |
| 2009/0225823 A1 | 9/2009 | Chen et al. | |
| 2010/0098197 A1 | 4/2010 | Nie et al. | |
| 2010/0195711 A1 | 8/2010 | Hasan et al. | |
| 2010/0198588 A1 | 8/2010 | Sudo et al. | |
| 2010/0289688 A1 | 11/2010 | Sherman et al. | |
| 2010/0303182 A1 | 12/2010 | Daneshrad et al. | |
| 2011/0090939 A1 | 4/2011 | Diener et al. | |
| 2011/0200089 A1 | 8/2011 | Umeda et al. | |
| 2011/0260920 A1 | 10/2011 | Dybdal et al. | |
| 2011/0268169 A1 | 11/2011 | Mitsugi et al. | |
| 2012/0140685 A1 | 6/2012 | Lederer et al. | |
| 2012/0244819 A1 | 9/2012 | Tang | |
| 2013/0170721 A1 | 6/2013 | Kim et al. | |
| 2014/0004812 A1 | 1/2014 | Haub et al. | |
| 2014/0308046 A1 | 10/2014 | Bliss et al. | |
| 2015/0311928 A1 | 10/2015 | Chen et al. | |
| 2016/0261297 A1 | 9/2016 | Heinikoski et al. | |
| 2017/0295581 A1 | 10/2017 | Takagi | |
| 2017/0324434 A1 | 11/2017 | Utter et al. | |
| 2018/0131403 A1 | 5/2018 | Dafesh et al. | |

OTHER PUBLICATIONS

Amoroso, "Adaptive A/D Converter to Suppress CW Interference in DSPN Spread-Spectrum Communications," *IEEE Trans. Commun.*, COM-31(10):1117-1123 (1983).

Borio et al., "Tracking and Mitigating a Jamming Signal with an Adaptive Notch Filter," www.insidegnss.com, Mar./Apr. 2014, pp. 67-73. https://www.insidegnss.com/auto/maraprl4-WP.pdf.

Bottomley et al., "A Generalized RAKE Receiver for Interference Suppression," *IEEE Journal on Selected Areas in Communications*, 18(8): 1536-1545 (2000).

Caijie et al., "Rejection of frequency sweeping interference in DSSS systems using improved polar exciser algorithm," *IEEE*, 1228-1231 (2007).

Calhoun, "Third Generation Wireless Systems, vol. 1, Post-Shannon Signal Architectures," Artech House, Boston, pp. 344-376 (2003).

Capozza et al., "Measured Effects of a Narrowband Interference Suppressor on GPS Receivers," ION 55th Annual Meeting, Cambridge, MA, pp. 1-7 (1999).

Choi et al., "Suppression of narrow-band interference in DS-spread spectrum systems using adaptive IIR notch filter," *Signal Process.*, 82(12):2003-2013 (2002).

Dipietro, "An FFT based technique for suppressing narrow-band interference in PN spread spectrum communications systems," International Conference on Acoustics, Speech, and Signal Processing 2:1360-1363 (1989).

Erpek et al., "Deep Learning for Launching and Mitigating Wireless Jamming Attacks," *IEEE Trans. Cogn. Commun. Networking*, 5(1): 1-14 (2018).

Ferrara, A method for cancelling interference from a constant envelope signal, *IEEE*, 33(1):316-319 (1985).

Gelli et al., "Cyclostationarity-based filtering for narrowband interference suppression in direct-sequence spread-spectrum systems," *IEEE J. Select. Areas Commun.*, 16(9): 1747-1755 (1998).

Henttu, "A new interference suppression algorithm against broadband constant envelope interference," *IEEE*, 2:742-746 (2000).

Hui et al., "Maximum likelihood sequence estimation in the presence of constant envelope interference," *IEEE*, 2:1060-1064 (2003).

Jiang et al., "Multiuser MIMO-OFDM for Next-Generation Wireless Systems," *Proceedings of the IEEE*, 95(7): 1430-1469 (2007).

Johnson et al., "Blind Equalization Using the Constant Modulus Criterion: A Review," *Proceedings of the IEEE*, 86(10): 1927-1950 (1998).

Ketchum et al., "Adaptive algorithms for estimating and suppressing narrow-band interference in PN spread-spectrum systems," *IEEE Trans. Commun.*, 30(5):913-924 (1982).

Ouyang et al., "Short-time Fourier transform receiver for nonstationary interference excision in direct sequence spread spectrum communications," *IEEE Trans. Signal Processing*, 49(4):851-863 (2001).

Pasupathy, "Compact power spectrum, good error rate performance, and easy synchronization make MSK an attractive digital modulation technique," *IEEE Communications Magazine*, 17:14-22 (1979).

Pouttu et al., "Effects of Rayleigh fading to method-selection in interference suppression," *IEEE*, 2:1225-1230(2005).

Pouttu et al., "Synchronization of FH/DS Signal with Interference Suppression Diversity," IEEE Ninth International Symposium on Spread Spectrum Techniques and Applications pp. 69-73 (2006).

Proakis et al., "Contemporary Communication Systems Using MATLAB® and Simulink®, Second Edition," Brooks/Cole Publishing Co., St. Paul, MN, pp. 268-273 (2004).

Przyjemski et al., "GPS Anti-Jam Enhancement Techniques," Proc. ION 49th Annual Meeting, pp. 41-50 (1993).

Raustia, "Combining method for FH-DS communications," *IEEE*, 4:2289-2293 (2005).

(56) References Cited

OTHER PUBLICATIONS

Ward, "Interference & Jamming: (Un)intended Consequences," TLS NovAtel's Thought Leadership Series, pp. 28-29 (2012).

* cited by examiner

INTERFERENCE SUPPRESSION USING MACHINE LEARNING

FIELD

The subject matter described herein relates to enhanced techniques for interference suppression using machine learning.

BACKGROUND

Receivers used in communication, navigation, radar, and other sensor applications can suffer from intentional or unintentional interference. Global Positioning System (GPS) jamming is a real-world threat, and although there are techniques to combat certain classes of jammers, many fail when multiple jammers impact the same signal. Anti-jamming techniques can be used to reduce the interference from a desired component, however each standard anti-jamming technique can have drawbacks. For example, utilizing spatial techniques (e.g., by employing multiple antennas at the victim receiver) can require the use of expensive and/or physically bulky antennas. Some anti jamming techniques require some known property of a jammer signal in order to isolate and reduce and/or remove such signal. For example, narrowband jammers can be reduced and/or removed in the frequency domain by notching out fast Fourier transform (FFT) bins, but this approach will not reduce and/or remove wideband jammers which completely overlap the victim signal bandwidth. In complex channel environments or with multiple jammers, some waveform properties may not be valid at a receiver. For example, a frequency modulated (FM) chirp jammer is generally a constant-envelope waveform. However, if there is multipath or there are several FM chirp jammers in the environment, combinations of multiple frequency modulation (FM) chirp jammers can manifest at the receiver as a waveform whose amplitude varies rapidly over time, so that mitigation techniques which employ the constant envelope technique may no longer useful. There are many combinations of jammer types that cannot easily be isolated in any particular transform or domain (e.g., time, frequency, amplitude, wavelet, etc.).

SUMMARY

In one aspect, interference can automatically be reduced within received signals using a trained ML model. A first radio frequency signal including (i) a desired component and (ii) an interference component having a noise component and a jammed component is received. A trained machine learning model extracts the jammed component and a portion of the noise component from the radio frequency signal. The trained ML model generates and outputs a second radio frequency signal having the desired component and a reduced noise component. The reduced noise component has the portion of the noise component removed. The jammed component is not present (e.g., removed) from the second RF signal.

In some variations, the jammed component and the portion of the noise component can be removed by applying a series of weights defined within the trained ML model.

In other variations, the radio frequency signal can be in an original domain such as a time domain, a frequency domain, an amplitude domain, or a wavelet domain. In some variations, the original domain of the first radio frequency signal can be converted to at least one domain having the frequency domain, the amplitude domain, or the wavelet domain, before the extraction, using a software defined radio. The first radio frequency signal can be converted back from the at least one domain to the original domain after the extraction. The radio frequency signal can be truncated to a predetermined window before converting the first radio frequency signal to the frequency domain.

In some variations, the trained machine learning model can be trained using a multi-stage approach having a first stage and a second stage. The first stage of the multi-stage approach can train a first machine learning model by receiving, by the first machine learning model, a first training signal of a plurality of training signals. The first training signal can be free of interference. A series of weights can be generated by the first machine learning model based on the first training signal to generate a first output identical to the first training signal. The first ML model can generate the first output signal by applying the series of weights to the first training signal. The first output can include an identical signal-to-noise ratio as the first training signal. During the second stage, a second ML model can be trained by receiving (i) the series of weights from the first ML model and (ii) a second training signal of the plurality of training signals having interference. The second ML model can generate the second radio frequency signal having the desired component and a reduced noise component using the series of weights received from the first ML model.

In other variations, the trained machine learning model includes (ii) a neural network trained by minimizing a mean square error or (ii) an adaptive learning rate optimization algorithm.

In some variations, the second radio frequency signal is provided to a global positioning system coarse acquisition code receiver. The second radio frequency signal can include a sum of binary-phase shift keyed modulated signals received at a power level below a power level of thermal noise present in the global positioning system coarse acquisition code receiver.

In other variations, the jammer component can partially spectrally overlaps the desired component. The jammer component can be a frequency modulated signal that sweeps a tone over a bandwidth of the desired component. The jammer component can include a signal modulated by amplitude modulation, frequency modulation, direct sequence spreading, frequency hopped spreading, or phase shift keying.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides a universal approach for any type of interference component to be reduced and/or removed from a desired component. Such removal can include the removal of multiple jammers from a signal simultaneously. Using a trained neural network or an adaptive learning rate optimization algorithm described herein can provide a clean, output signal having the reduced interference by removing jammer components and reducing a noise component.

BRIEF DESCRIPTION OF THE DRAWINGS

Like reference symbols in the various drawings indicate like elements.

DETAILED DESCRIPTION

A signal received by a receiver can include both a desired component (e.g., the signal expected to be received) and interference components. Interference for the purpose of this disclosure includes noise introduced by either internal components of the receiver or components external to the receiver and/or undesired jammer signals (e.g., caused by either unintentional or intentional efforts to modify the desired component). Interference can be reduced from a received signal so as to output the desired component with a reduced noise component using a number of different signal processing techniques. In some systems, properties of the interference components are not known. In such cases, it can be desirable to use a blind technique, in which properties of the desired component also may not necessarily be known. In other systems, properties of the interference components are known. The subject matter herein minimizes interference from a received signal to generate a desired component having no jammer components and reduced noise regardless of whether properties of the interference are known while also keeping the desired component with minimal perturbations. In other words, the subject matter described herein provides an anti jamming technique which can simultaneously remove multiple classes of interference types. A received signal having a desired component, additive white Gaussian noise, and/or interference components (e.g., zero, one, or multiple interference components) is provided to train a machine learning (ML) model (e.g. a neural network, adaptive learning rate optimization algorithm, etc.). The ML model then removes the interference components within the received signal, in turn generating an output signal having the desired component, no jammer components, and minimized noise.

Figure 1:
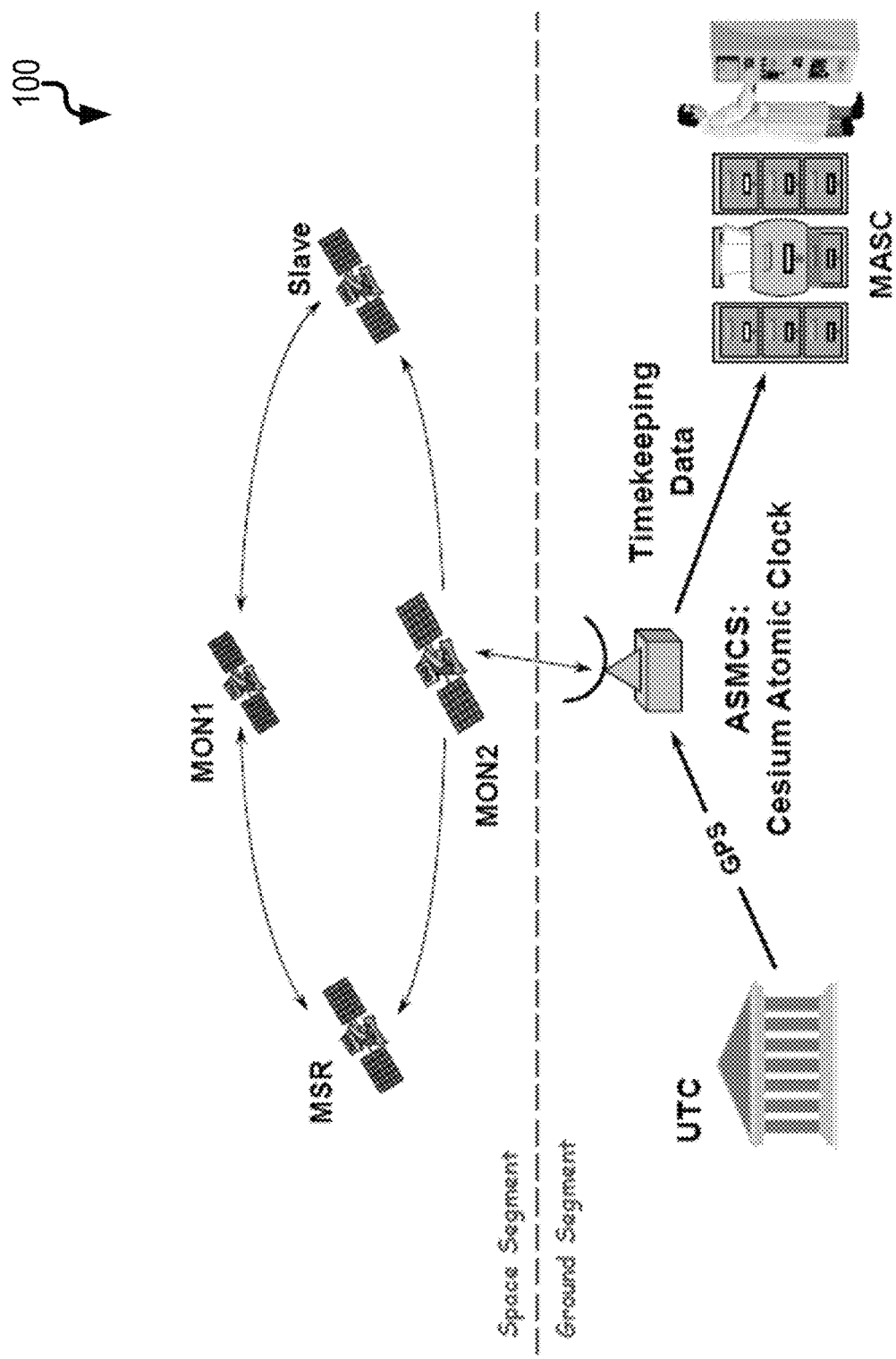
FIG. 1 illustrates an example system that automatically reduces interference from a received signal using machine learning.

FIG. 1 illustrates an example system 100 that automatically reduces interference from a received signal using ML. Example system 100 processes an input dataset of a signal with interference 102 and generates an output of a signal with reduced interference 104.

The signal with interference 102 and the signal with reduced interference 104 can be provided to ML model(s) 130 in a raw signal form or in a vector form generated from raw signals (i.e., the features from the signals 102, 104 can be extracted to populate a vector, etc.). The signal with interference 102 can be a digital signal or an analog signal. For example, in some variations the signal with interference can be a radio frequency (RF) signal received by a radio antenna or receiver device. In other variations the present systems and methods are used to reduce interference for GPS coarse acquisition (C/A) code receivers, the desired component can include a sum of binary-phase shift keyed (BPSK) modulated signals received at a power level below the power level of the thermal noise present in the GPS C/A code receiver. In such variations, the interference can include a signal which completely overlaps the desired component. Such an example interferer can be referred to as a matched spectral interferer. One type of matched spectral C/A code interferer is a BPSK signal transmitted at the same symbol rate of the C/A code (e.g., 1.023 Mchips/sec), or quadrature phase shift keying (QPSK) or quadrature amplitude modulation (QAM) interference using the same symbol rate of the C/A code. In some variations, the interference components can partially spectrally overlap the signal, such as BPSK at lower or higher symbol rates than the desired component. Another non-limiting example of interference components is a frequency modulated signal which sweeps a tone over the desired component bandwidth. FM swept-tone interference is a common type of signal used to disrupt GPS receivers in intentional GPS jamming equipment. In other variations, the signal with interference 102 can be modulated in a number of ways, including, but not limited to, AM modulation, FM modulation, direct sequence spreading, frequency hopped spreading, or phase shift keying.

The signal with interference 102 can be in the time domain, the frequency domain, the amplitude domain, discrete wavelet transform, or any other domain or transform. For example, a signal with interference 102 in the time domain can be a quadrature (IQ) signal. IQ signals can, in some examples, be provided by an analog-to-digital converter (ADC) that sampled an RF signal translated to baseband. Such IQ signals can be provided directly by the ADC or include additional post-processing after the ADC. In the frequency domain, for example, the signal with interference 102 can be the output of an N-length fast Fourier transform (FFT) of IQ signals. A signal with interference 102 in the amplitude domain, for example, can be a representation of the time or frequency domain as amplitude and phase components.

The interference components can have, but need not necessarily have, a greater power than that of the desired component. In some variations, the power of the interference components can be significantly larger than the desired component, and can be anywhere from 10 times larger than the desired component (10 dB) to 1,000,000,000 times larger than the desired component (90 dB). In other variations, the interference to signal power ratio can be greater than 1,000,000,000 (90 dB).

The signal with reduced interference 104 generated by ML model(s) 130 can be the same domain as the signal with interference 102 or can be in a different domain than the signal with interference 102. The domain of the signal with reduced interference 104 can depend upon how the machine learning model(s) 130 are trained.

The system 100 includes one or more processing systems 110. Processing system 110 includes ML model(s) 130. ML model(s) 130 are trained prior to processing the signal with interference 102. The signal with interference 102 and training data 106 may be received by the processing system 110 via a communications network, e.g., an Internet, an intranet, an extranet, a local area network (LAN), a wide area network (WAN), a metropolitan area network (MAN), a virtual local area network (VLAN), and/or any other network. The signal with interference 102 and training data 106 may also be received via a wireless, a wired, and/or any other type of connection. The signal with interference 102 and training data 106 may also be generated by simulation (e.g., on a local or external processing system). The simulation can generate multiple realizations and/or combinations of signal and interference waveforms. ML model(s) 130 are trained by evaluating the training dataset 106 that is annotated to achieve a particular purpose of reducing interference components (e.g., jammers and/or noise).

In one particular variation, a ML model can be trained to remove FM chirp jammers from GPS signals. In this variation, simulations can produce waveforms with a single BPSK signal buried in additive white Gaussian noise (AWGN) at levels typically expected for GPS signals. The BPSK signal can attempt to represent a GPS C/A code signal impinging on a GPS receiver, but does not have to be exactly the same symbol rate or C/A code sequence as actual GPS signals. The desired signal used for training in this GPS case does not even have to be a simulation of a BPSK signal, it can be a QPSK signal buried in AWGN at GPS-appropriate levels. The desired component could also be simulated military code (e.g., M-code) or precision secure (P(Y)) signals, or any other GPS or Global Navigation Satellite System (GNSS) signals or combination thereof. These simulated desired component waveforms can be combined with interference component waveforms. The interference comping waveforms can have zero, one, or multiple FM simulated signals. The benefit of training the ML model with various jamming scenarios, simultaneously, is to allow the ML model to learn to not remove the desired component even when there is no jammer present. The ML model can be trained to produce the desired component waveform at the output, which is the BPSK signal combined with the AWGN noise.

In another variation, a ML model can be trained to remove multiple combinations of jammers, each jammer having a different modulation type. For example, a dataset can be created which has simulated GPS signals buried in noise corrupted by no jammers, as well as one or more jammers with either BPSK/QPSK modulation or FM modulation or no modulation, or any combination thereof. In this variation, the desired component (e.g., the BPSK signal plus the AWGN noise) can be presented as the training reference (e.g., data used to train the ML model). In yet another variation, one could define the training reference as only the BPSK signal (without the AWGN noise).

In yet another variation, a ML model can be trained to remove jammers from non-GPS desired signals such as communication links that employ desired signals that are not buried in AWGN noise. In this variation, the desired signal could be of any modulation type, at any signal-to-noise ratio (SNR), depending on the application. For example, the desired signal could be a simulated Digital Video Broadcasting—Second Generation (DVB-S2) signal at a particular SNR, or a simulated LTE signal at a particular SNR. The jammer signal could be any possible combination of jammer waveforms particular to the threat environment one wishes to mitigate. Once trained, ML model(s) 130 process signal with interference 102 to remove the interference components (e.g., jammers and/or noise) from the signal with interference 102 to output a signal with reduced interference 104 (e.g., desired component and a reduced noise component). The signal with reduced interference 104 includes a desired component with reduced noise that is close to or exactly the same as the actual desired component transmitted to the receiver having some noise. During operation, in some variations, ML model(s) 130 do not require information on the desired component or feedback from the receiver receiving the signal with interference 102 for the particular signal being analyzes. The same trained ML model(s) 130 can be used for any type of signal and does not require switching of algorithms and/or signal domains to accommodate different signals.

ML model(s) 130 reduce interference components from the signal with interference 102 by removing jammer components and reducing noise. During training, ML model(s) 130 use an iterative learning process in which data (e.g., training data 106) is provided as input and weights are assigned to the input values. The more training data 106 provided to the ML model(s) 130, the more robust and versatile the ML model(s) 130 become. During training of the ML model(s) 130, the weights are adjusted each time to adjust an output. The ML model(s) 130 process each training signal within training data 106, one at a time, using weights and functions within hidden layers of the ML model(s) 130. An output signal is generated by the ML model(s) 130 using a combination of the weights and input signal. The output signal is then evaluated against a desired component (e.g., a signal having no interference). Any error between the output signal and the desired component are propagated back to through the ML model(s) 130, in turn causing the weights to be adjusted for the next input signal of training data 106. This training process continues for each signal within training data 106 with the weights of the ML model(s) 130 changing continuously. The same set of training data 106 can be provided to the ML model(s) 130 as many times as required in order to continually refine the output signals. Example machine learning models used in connection with the subject matter described herein can include TensorFlow and/or Keras.

Training data 106 can include actual or simulated signals. For example, training data 106 can be any combination of actual and/or simulated desired components, actual and/or simulated noise components, and actual and/or simulated jammer components. Training data 106 can also include various jammer-to-signal ratios, signal-to-noise ratios (SNRs), and/or jammer-to-noise ratios over a particular range (e.g., relative to nominal GPS signals for a ML model trained for use in a GPS anti jamming or relative to nominal expected cell phone receiver handset levels for use in a LTE anti-jamming use case). In some variations, jammer components can include actual and/or simulated FM chirps with varying bandwidths, sweep rates, amplitudes, phases, and/or center frequencies. Any type of possible modulation may be used for training, as the use-case will define what the ML model is trained for.

ML model(s) 130 can be trained, in some variations, using a multi-stage approach. With a multi-stage approach, a first ML model of the ML model(s) 130 is first trained as an auto-encoder that learns how to generate an output that is the same as the input. For example, the first ML model can receive a first training signal of a plurality of training signals in a dataset. The first training signal and/or all signals within the plurality of training signal is free of interference (e.g., has no interference present within the signal). A series of weights associated with a neural network can be automatically adjusted so as to generate a first output that is identical to the first training signal. With those set series of weights applied to the first training signal, the first ML model can generate the first output signal that has an identical signal-to-noise ratio as the first training signal. The series of weights can be continually adjusted for each signal within the training dataset having interference free signals.

In a second stage of training, a second ML model of the ML model(s) 130 is trained with a dataset having combinations of desired signal and expected AWGN, and either zero, one, or multiple jammer waveforms. The second stage training dataset may have instances of any types of jammer waveform combinations (e.g., zero, one, or multiple jammers). Transfer learning can be used in which a ML model is used to train a second ML model. Neural network weights determined from the training of the first model can at least reproduce the desired signal when there is no jammer present, and they are then re-trained to also reproduce the desired signal when a combination of jammers is present.

In some variations, the ML model(s) 130 can be one that receives input vector signal samples and produces output vectors of those samples through a series down-sampling and up-sampling iterations. The signal samples can be in any single domain such as the time domain or frequency domain or in multiple domains as previously described. The ratio between the number of input and output samples does not have to be a one-to-one correlation. Additionally, if the signal with interference 102 and signal with reduced interference 104 are in vector form, the length of the vectors may not necessarily be the same. In some variations, the ML model(s) 130 can either decimate or interpolate the signal with interference 102 to remove the interference component, while still generating signal with reduced interference 104 having the desired component.

In some variations, ML model(s) 130 can be a U-Net convolutional neural net topology or an adaptive learning rate optimization algorithm (e.g., ADAM). The U-Net topology is a powerful architecture that is used for semantic segmentation of images U-Net neural network is trained by minimizing the mean square of the output of the network minus the desired component output when the input signal is pushed through the network. For example, for extracting interference components from the signal with interference 102, a U-Net neural network minimizes the mean square error between the output and the signal with reduced interference 104. An advantage of the U-Net topology is that it allows for a high filter complexity without sacrificing throughput. In other words, the output signal (e.g., desired component) has minimal degradation after removal of the jammer components and reduced noise. While the U-Net topology is one option for ML model(s) 130, it is recognized that ML model(s) 130 may include any technique available in the art including, but not limited to, a deep neural network that uses a series of decoders and encoders for sampling (e.g., LinkNet), a neural network that identifies a number of different sub-region representations from a feature map and up-samples and concatenates the layers to form a final feature representation of the input (e.g., Pyramid Scene Parsing Network or PSPNet), and/or a neural network having a feature extractor that works with object detectors to generate multiple feature layers of an input (e.g., feature pyramid networks FPN).

Figure 2:
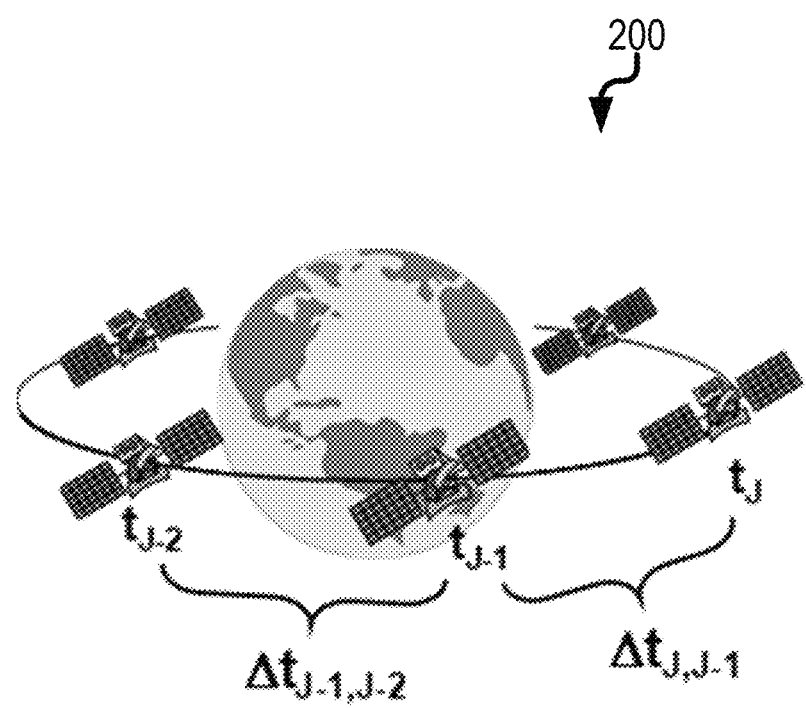
FIG. 2 illustrates another example system that automatically reduces interference from a received signal using machine learning.

FIG. 2 illustrates another example system 200 that automatically reduces interference from a received signal using ML. In the variation illustrated in FIG. 2, processing system 210 includes a software defined radio (SDR) 220 that facilitates operation of receiving the signal with interference 102 in real-time and interfaces with ML model(s) 130. SDR 220 can include FFT 222 and inverse FFT (IFFT) 224. FFT 222 can receive the signal with interference 102 in a first domain and convert it to a representation in the frequency domain. In doing so, FFT 212 can also partition the signal with interference 102 into N-signal samples and provide those samples to ML model(s) 130 for processing. SDR 220 can also include IFFT 224 that receives a signal from ML model(s) 130 in the frequency domain and translates the signal back to the first domain, outputting the signal with reduced interference 104.

Figure 3:
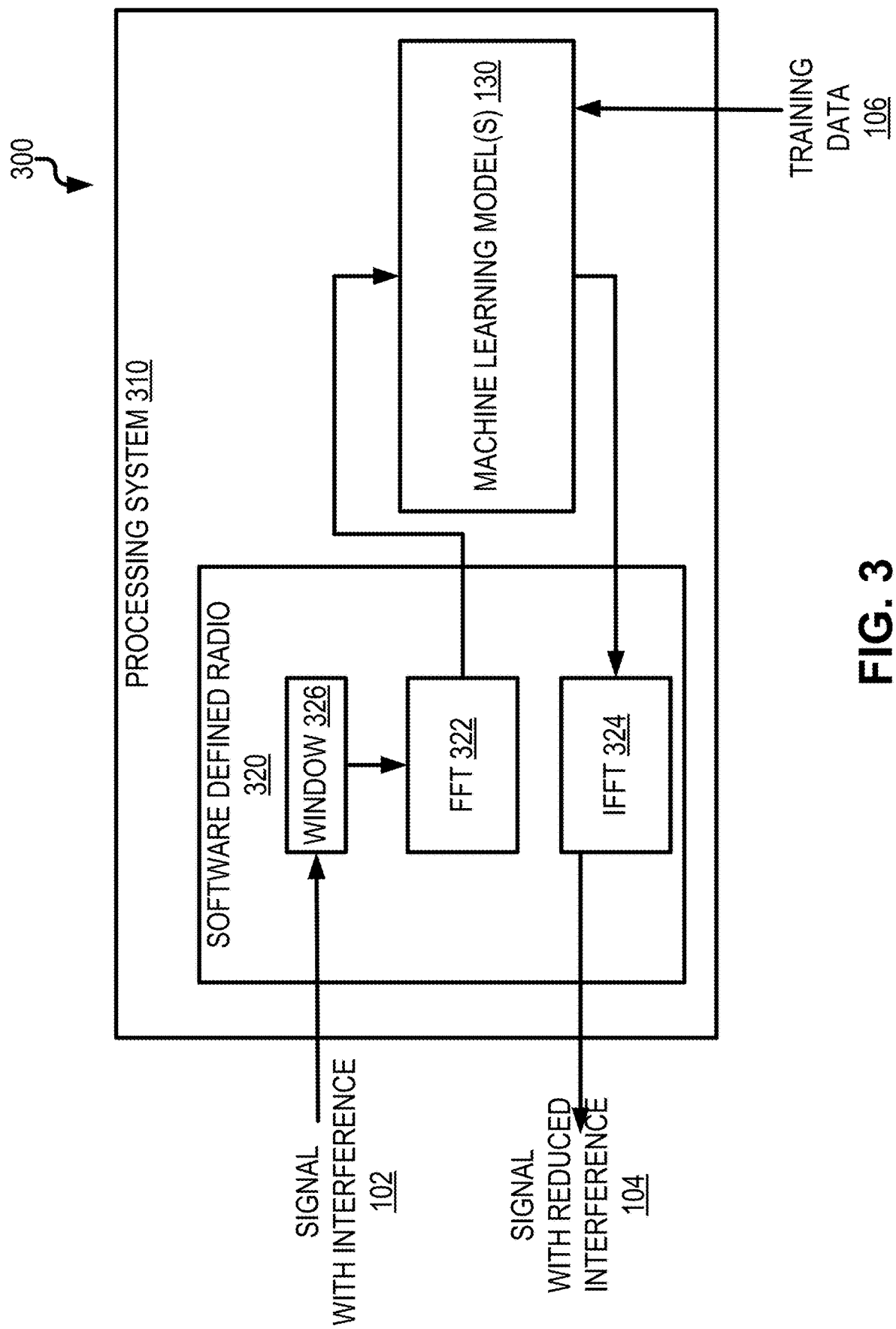
FIG. 3 illustrates another example system that automatically reduces interference from a received signal using machine learning.

FIG. 3 illustrates another example system 300 that automatically reduces interference from a received signal using ML. In the variation illustrated in FIG. 3, processing system 310 includes SDR 320. SDR 320 includes window 326, FFT 322, and IFFT 324. Both FFT 322 and IFFT 324 have similar features to those described for FFT 222 and IFFT 224 of FIG. 2. A signal with interference 102 is received by SDR 320. Window 326 truncates the signal with interference 102 and provides that truncated signal to FFT 322 for processing.

Figure 4B:
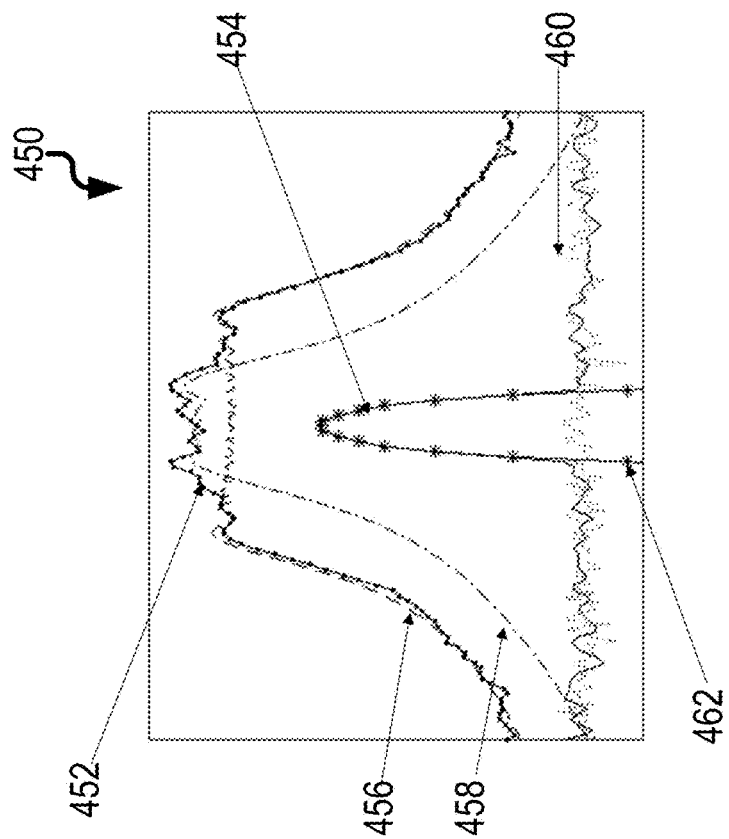
FIG. 4B illustrates a graphical chart of an example radio frequency signal processed using the techniques described herein.
Figure 4A:
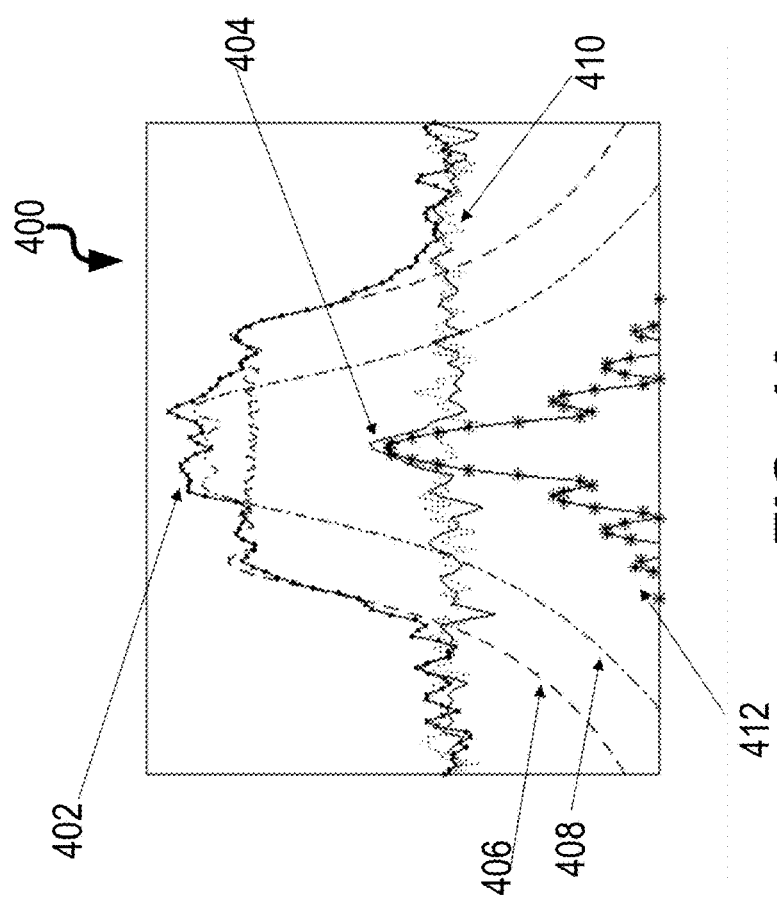
FIG. 4A illustrates a graphical chart of a global position system signal processed using the techniques described herein.

FIG. 4A illustrates a graphical chart 400 of a GPS signal processed using the techniques described herein. As illustrated in FIG. 4A, a GPS signal with interference 402 can include, for example, two separate jammer components 406, 408, a noise component 410, and a desired component 412 (e.g., a signal with no interference). Jammer components 406, 408 can have signal fluctuations, such as amplitude fluctuations. ML model(s) 130 can identify both jammer components 406, 408 and the noise component 410 and remove those from the signal with interference 402 to generate signal with reduced interference 404. The signal with reduced interference 404 includes the desired component 404 having jammer components 406, 408 removed and a reduced noise component.

FIG. 4B illustrates a graphical chart 450 of a RF signal processed using the techniques described herein. As illustrated in FIG. 4B, a RF signal with interference 452 can include, for example, two separate jammer components 456, 458, a noise component 460, and a desired component 462 (e.g., a signal with no interference). Jammer components 456, 458 can have signal fluctuations, such as amplitude fluctuations. ML model(s) 130 can identify both jammer components 456, 458 and the noise component 460 and remove those from the signal with interference 452 to generate signal with reduced interference 454. The signal reduced interference 454 includes the desired component 454 having jammer components 456, 458 removed and a reduced noise component.

Figure 5:
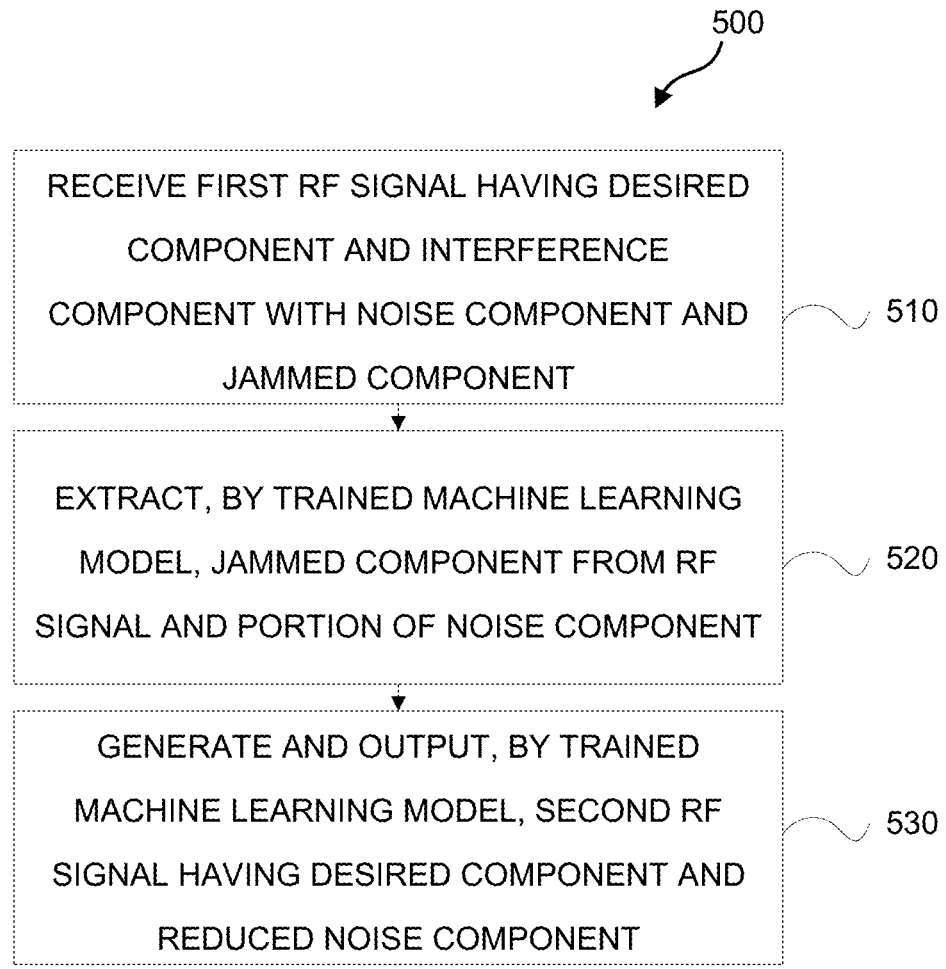
FIG. 5 illustrates a flow chart of automatically reduces interference from a received signal using machine learning.

FIG. 5 illustrates a flow chart 500 for automatically reducing interference from received signals using ML. Trained ML model(s) 130 receives, at 510, a first RF signal having a desired component and interference (e.g., interference 102). The interference includes a noise component and a jammer component. The trained ML model(s) 130 extract, at 520, the jammed component and a portion of the noise component, leaving the signal component and a reduced noise component (e.g., the noise component of the first RF signal having the extracted portion removed). The trained ML model(s) 130 generate and output, at 530, a second RF signal (e.g., signal with reduced interference 104) having the desired component and a reduced noise component. The reduced noise component has the portion of the noise component removed. The jammed component is not present in the second RF signal.

One or more aspects or features of the subject matter described herein can be realized in digital electronic circuitry, integrated circuitry, specially designed application specific integrated circuits (ASICs), field programmable gate arrays (FPGAs) computer hardware, firmware, software, software-defined radio (SDR), and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 6:
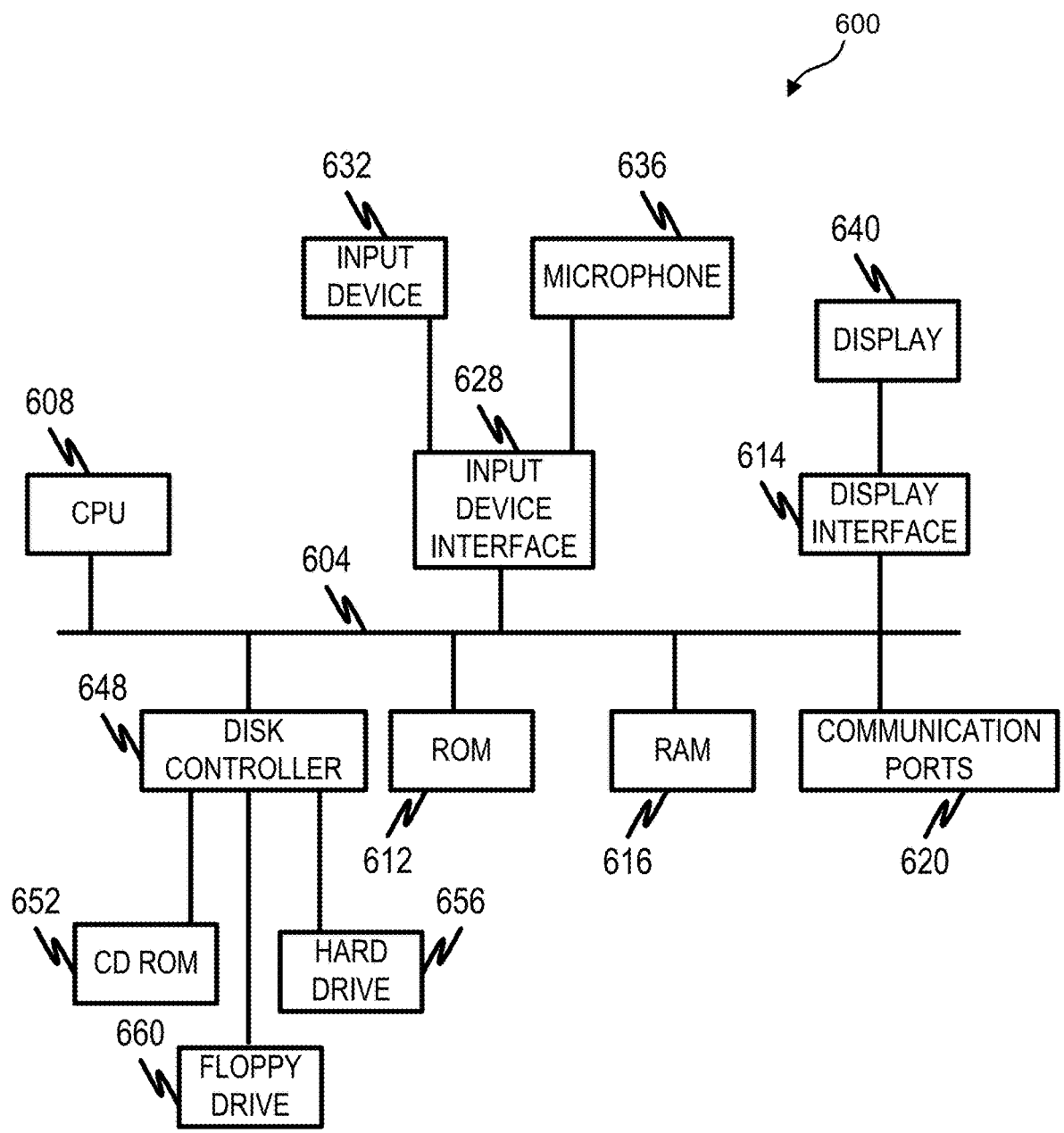
FIG. 6 is a diagram illustrating a sample computing device architecture for implementing various aspects described herein.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. In the input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A method for automatically reducing interference within received signals, the method comprising:
   receiving a first radio frequency (RF) signal comprising (i) a desired component and (ii) an interference component having a noise component and a jammed component;
   extracting, by a trained machine learning (ML) model, from the first RF signal, the jammed component and a portion of the noise component; and
   generating and outputting, by the trained ML model, a second RF signal comprising the desired component and a reduced noise component, wherein (i) the reduced noise component has the portion of the noise component removed and (ii) the jammed component is removed from the second RF signal,
   wherein the trained ML model is trained using a multi-stage approach comprising a first stage and a second stage, the first stage of the multi-stage approach training a first ML model by:
      receiving, by the first ML model, a first training signal of a plurality of training signals, wherein the first training signal is free of interference;
      generating, by the first ML model, a series of weights based on the first training signal to generate a first output identical to the first training signal; and
      generating, by the first ML model, the first output signal by applying the series of weights to the first training signal, wherein the first output comprises an identical signal-to-noise ratio as the first training signal; and
   wherein the second ML model is trained by:
      receiving, by the second ML model, (i) the series of weights from the first ML model and (ii) a second training signal comprising interference; and
      generating, by the second ML model, the second RF signal comprising the desired component and a reduced noise component using the series of weights received from the first ML model.

2. The method of claim 1, wherein the jammed component and the portion of the noise component are removed by applying a series of weights defined within the trained ML model.

3. The method of claim 1, wherein the first RF signal is in an original domain comprising a time domain, a frequency domain, an amplitude domain, or a wavelet domain.

4. The method of claim 3, further comprising:
   converting before the extracting, using a software defined radio (SDR), the original domain of the first RF signal to at least one domain comprising the frequency domain, the amplitude domain, or the wavelet domain;
   converting after the extracting, using the SDR, the first RF signal back from the at least one domain to the original domain.

5. The method of claim 4, further comprising truncating the first RF signal to a predetermined window before converting the first RF signal to the frequency domain.

6. The method of claim 1, wherein the trained machine learning model comprises (ii) a neural network trained by minimizing a mean square error or (ii) an adaptive learning rate optimization algorithm.

7. The method of claim 1, further comprising providing the second RF signal to a global positioning system (GPS) coarse acquisition (C/A) code receiver.

8. The method of claim 7, wherein the second RF signal comprises a sum of binary-phase shift keyed (BPSK) modulated signals received at a power level below a power level of thermal noise present in the GPS C/A code receiver.

9. The method of claim 7, wherein the jammed component partially spectrally overlaps the desired component.

10. The method of claim 7, wherein the jammed component is a frequency modulated signal that sweeps a tone over a bandwidth of the desired component.

11. The method of claim 7, wherein the jammed component comprises a signal modulated by amplitude modulation, frequency modulation, direct sequence spreading, frequency hopped spreading, or phase shift keying.

12. The method of claim 1, wherein the operations further comprise providing the second RF signal to a global positioning system (GPS) coarse acquisition (C/A) code receiver, wherein the second RF signal comprises a sum of binary-phase shift keyed (BPSK) modulated signals received at a power level below a power level of thermal noise present in the GPS C/A code receiver.

13. The method of claim 12, wherein (i) the jammed component partially spectrally overlaps the desired component, (ii) the jammed component is a frequency modulated signal that sweeps a tone over a bandwidth of the desired component, or (ii) the jammed component comprises a signal modulated by amplitude modulation, frequency modulation, direct sequence spreading, frequency hopped spreading, or phase shift keying.

14. A system for automatically reducing interference within received signals, the system comprising:
   a data processor; and
   memory storing instructions stored on the data processor, which when executed result in operations comprising:
      receiving a first radio frequency (RF) signal comprising (i) a desired component and (ii) an interference component having a noise component and a jammed component;
      extracting, by a trained machine learning (ML) model, from the RF signal, the jammed component and a portion of the noise component; and
      generating and outputting, by the trained ML model, a second RF signal comprising the desired component and a reduced noise component, wherein (i) the reduced noise component has the portion of the noise component removed and (ii) the jammed component is removed from the second RF signal;
   wherein the trained ML model is trained using a multi-stage approach comprising a first stage and a second stage, the first stage of the multi-stage approach training a first ML model by:

receiving, by the first ML model, a first training signal of a plurality of training signals, wherein the first training signal is free of interference;

generating, by the first ML model, a series of weights based on the first training signal to generate a first output identical to the first training signal; and generating, by the first ML model, the first output signal by applying the series of weights to the first training signal, wherein the first output comprises an identical signal-to-noise ratio as the first training signal; and wherein the second ML model is trained by:

receiving, by the second ML model, (i) the series of weights from the first ML model and (ii) a second training signal comprising interference; and generating, by the second ML model, the second RF signal comprising the desired component and a reduced noise component using the series of weights received from the first ML model.

15. The system of claim 14, wherein the jammed component and the portion of the noise component are removed by applying a series of weights defined within the trained ML model.

16. The system of claim 14, wherein the first RF signal is in an original domain comprising a time domain, a frequency domain, an amplitude domain, or a wavelet domain and wherein the operations further comprise:

converting before the extracting, using a software defined radio (SDR), the original domain of the first RF signal to at least one domain comprising the frequency domain, the amplitude domain, or the wavelet domain;

converting after the extracting, using the SDR, the first RF signal back from the at least one domain to the original domain; and truncating the RF signal to a predetermined window before converting the first RF signal to the frequency domain.

17. The system of claim 14, wherein the trained machine learning model comprises (ii) a neural network trained by minimizing a mean square error or (ii) an adaptive learning rate optimization algorithm.

18. A non-transitory computer program product storing instructions which, when executed by at least one data processor forming part of at least one computing device, implement operations comprising:

receiving a first radio frequency (RF) signal comprising (i) a desired component and (ii) an interference component having a noise component and a jammed component;

extracting, by a trained machine learning (ML) model, from the RF signal, the jammed component and a portion of the noise component; and generating and outputting, by the trained ML model, a second RF signal comprising the desired component and a reduced noise component, wherein (i) the reduced noise component has the portion of the noise component removed and (ii) the jammed component is removed from the second RF signal, wherein the trained ML model is trained using a multi-stage approach comprising a first stage and a second stage, the first stage of the multi-stage approach training a first ML model by:

receiving, by the first ML model, a first training signal of a plurality of training signals, wherein the first training signal is free of interference;

generating, by the first ML model, a series of weights based on the first training signal to generate a first output identical to the first training signal; and generating, by the first ML model, the first output signal by applying the series of weights to the first training signal, wherein the first output comprises an identical signal-to-noise ratio as the first training signal; and wherein the second ML model is trained by:

receiving, by the second ML model, (i) the series of weights from the first ML model and (ii) a second training signal comprising interference; and generating, by the second ML model, the second RF signal comprising the desired component and a reduced noise component using the series of weights received from the first ML model.

* * * * *